March 11, 1969    H. G. STENGER    3,432,586
PROCESS FOR FORMING PLASTIC CONTAINERS
Filed July 29, 1966    Sheet 1 of 2
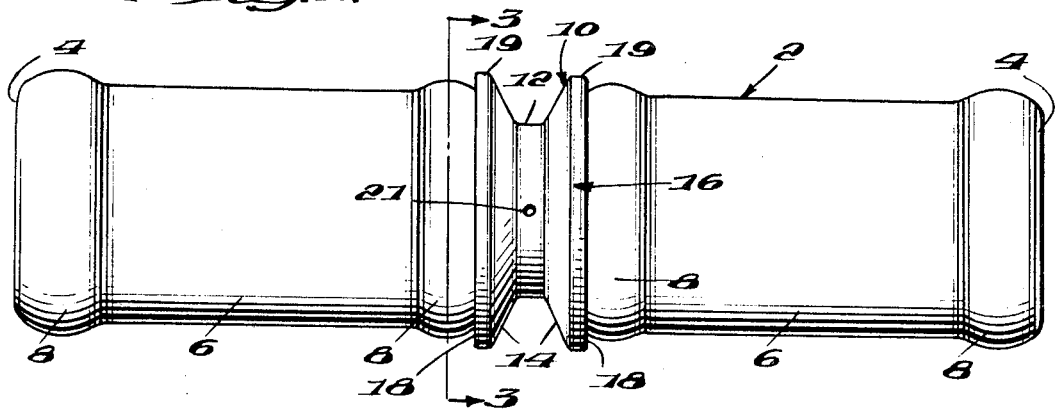
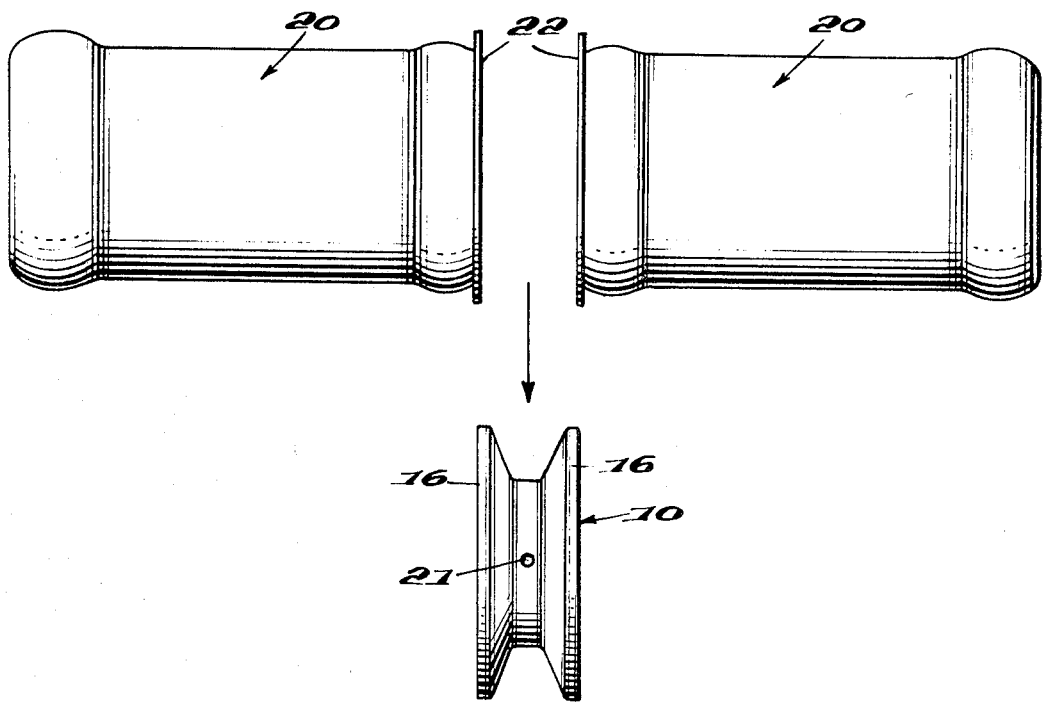

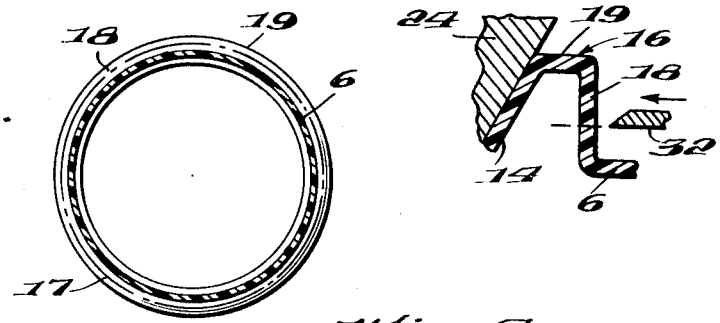
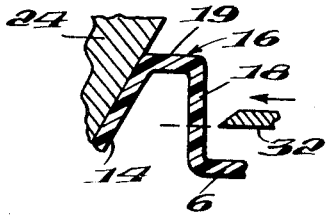
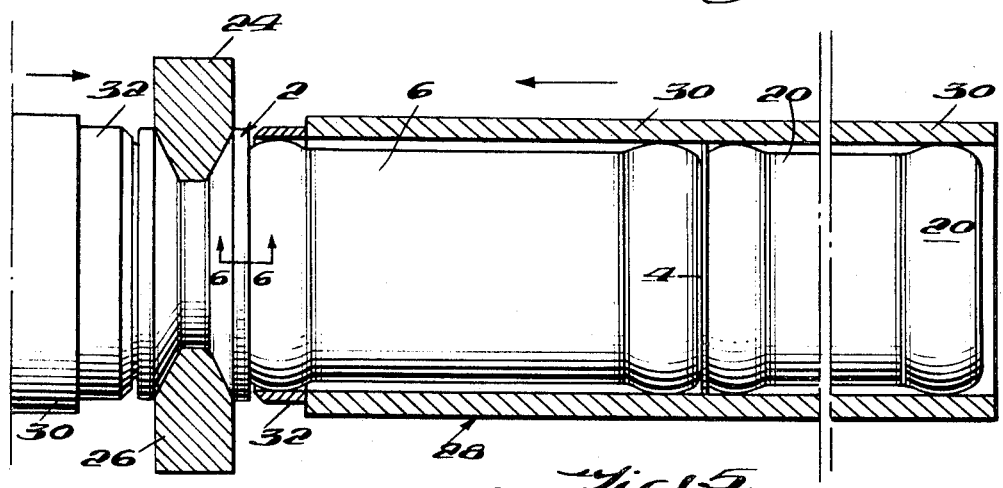
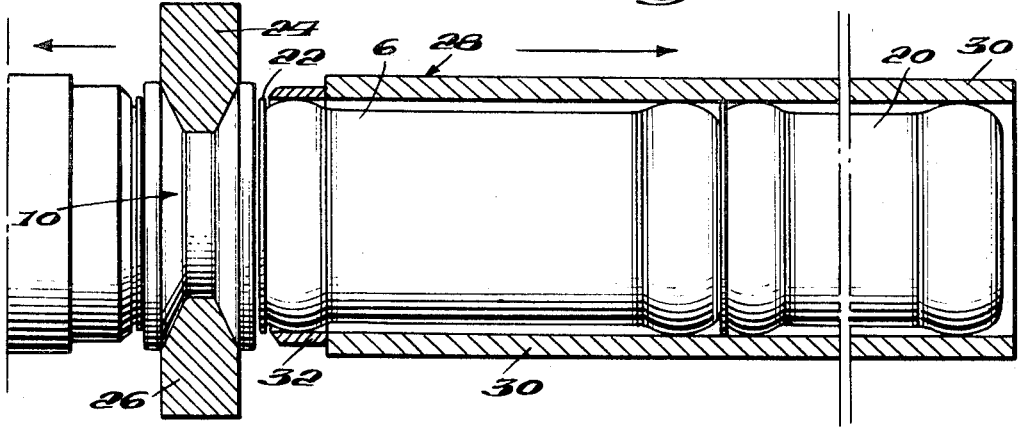

United States Patent Office 3,432,586
Patented Mar. 11, 1969

3,432,586
PROCESS FOR FORMING PLASTIC CONTAINERS
Hans G. Stenger, Plainfield, N.J., assignor, by mesne assignments, to American Can Company, New York, N.Y., a corporation of New Jersey
Filed July 29, 1966, Ser. No. 568,517
U.S. Cl. 264—94
Int. Cl. B26d 3/00
9 Claims

ABSTRACT OF THE DISCLOSURE

In a process for making wide mouth plastic containers, a molded hollow blank has its opposite ends closed and an intermediate or neck portion joins two potential container body portions. The neck portion has a pair of radially extending flanges spaced longitudinally apart. A holder is applied to the blank between the flanges and a knife is passed coaxially over the blank from one end to penetrate one of the flanges. Another knife is passed over the blank from the other end also coaxially to penetrate the other flange, whereby the neck portion of the blank between the flanges is separated from the blank thereby to form two container bodies.

---

This invention relates to thin walled plastic containers, and more particularly, to processes for forming blow molded containers.

Hollow plastic articles, such as containers, may be formed by blow molding techniques. A tubular parison of thermoplastic material that has been softened sufficiently to allow expansion under internal pressure is clamped at its opposite ends between a pair of mold sections. A cavity in the mold surrounds the parison. Air is injected into the interior of the parison under pressure through a hypodermic needle which penetrates the wall of the parison. The air pressure causes the parison to expand until it conforms to the shape of the mold cavity. When the mold sections are separated, the hollow molded article is removed from the mold and excess material is trimmed from the article, if necessary.

Uusually, one article is blow molded at a time. When a container is being molded, the mouth of the container is formed at one end of the parison. Any accumulation of flash around the container mouth is subsequently removed in a trimming operation. Increased production rates have been achieved by blowing a pair of containers in the same mold with the mouth or neck of the containers joined together by an intermediate portion of the blank. The hypodermic needle penetrates the intermediate portion for blowing the tubular parison. The pinched off ends of the parison are at the bottoms of the respective containers, while the mouth or opening of both containers is at the intermediate or neck portion. This arrangement is satisfactory for relatively small mouth containers, but not for wide mouth containers.

The tubular parison normally has a diameter that is substantially less than that of the body portion of the completed article. When the neck of the article is only slightly larger than the diameter of the parison, the air injection needle may be relatively short. Since the parison is not greatly expanded at the intermediate portion of the mold cavity, there is very little danger of the parison tearing at the point where the needle pierces the parison. On the other hand, if the tandem blown container is to have a wide mouth, it would seem that the parison must be expanded to a considerable degree at the intermediate portion of the mold cavity. Furthermore, a long air injection needle would be required to reach and to penetrate the parison. These conditions would probably produce many defective articles due to tearing of the parison around the needle hole.

In forming wide mouthed containers, such as cans, it is important for the opening in the container to be substantially concentric and to lie in a plane that is perpendicular to the central axis of the container, so that the lid or closure for the container may be applied tightly. Since the containers have thin walls and a relatively large diameter at the mouth where they are to be severed from the intermediate portion, it is difficult to hold the container rigid during the trimming operation. Usually, a high production rate is desirable in order that the cost of individual containers does not become prohibitively high, but under these conditions, wide mouth containers cannot be formed by conventional tandem blow molding techniques.

Accordingly, it is an object of this invention to provide an efficient process for forming wide mouth containers, such as cans.

It is a further object of this invention to provide a process for forming wide mouth containers by tandem blow molding techniques.

It is a still further object of this invention to provide a process for rapidly and accurately trimming tandem blown, wide mouth plastic containers.

These objects are accomplished in accordance with a preferred embodiment of the invention by blow molding an elongated hollow plastic blank having a relatively thin wall and having an intermediate or neck portion joining the can portions at the opposite ends of the blank. The neck portion includes a circumferential groove and a pair of radial flanges on opposite sides of the groove extending outwardly to a diameter greater than the maximum diameter of the adjacent can portions of the blank. The circumferential groove in the neck portion cooperates with a holder to support the blank rigidly while the trimming operation takes place. A tubular knife is inserted over one end of the blank. The knife has a cutting edge facing toward the radial flange of the neck portion, and the knife advances longitudinally of the blank toward the flange. The circular cutting edge of the knife, which lies in a plane parallel to that of the radial flange, has a diameter greater than that of the can portion of the blank, but less than the maximum diameter of the radial flange. The knife continues to advance until the cutting edge pierces the flange, thereby severing the can portion from the neck portion of the blank. Preferably, the severed can portion is temporarily lodged in the interior of the tubular knife, and is subsequently discharged through the opposite end of the tubular knife. Similarly, a cylindrical knife is inserted over the opposite end of the blank and severs the radial flange connecting the can portion with the neck portion, thereby separating the can portion from the flange. The resulting wide mouth can has a lip of substantially uniform diameter and the lip lies in a plane that extends substantially perpendicular to the central axis of the can. Since the lip of the can is severed evenly, a cover or cap may be easily applied to the can.

This embodiment is illustrated in the accompanying drawings in which:

FIG. 1 is a side elevational view of the tandem blown can blank of this invention;

FIG. 2 is a side elevational view of the can blank showing schematically the removal of the neck portion of the blank;

FIG. 3 is a cross sectional view of the blank along the line 3–3 in FIG. 1;

FIG. 4 is a cross sectional view of the blank supported rigidly in a fixture and showing the tubular knife severing the can portion from the blank;

FIG. 5 is a side elevational view of the blank showing schematically the separation of the can portion from the neck portion; and FIG. 6 is a detail cross sectional view of the flange and holder along the line 6–6 in FIG. 4.

In accordance with this invention, a thin walled blank 2 is formed by tandem blow molding techniques. The blank 2 has closed ends 4 where the ends of the parison are pinched together by the mold sections. The blank includes side walls 6 which are preferably cylindrical, although they may be square, octagonal, or odd shaped. Ribs such as indicated at 8, or other minor variations in diameter may be present in the cylindrical walls 6.

The intermediate or neck portion 10 of the blank 2 has a circumferential groove 12 with outwardly sloping side walls 14. Between each of the groove walls 14 and the side walls 6, there is a radial flange 16. Each flange 16 has a shoulder 18 adjacent the side wall 6 and a cylindrical portion 19 connecting the shoulder 18 with the groove wall 14. Preferably, the interior surface of the cylindrical portion 19 is spaced radially outward from the outer surface of the wall 6.

The base of the groove 12 has a substantially smaller diameter than any other part of the blank and may be only slightly larger than the diameter of the tubular parison from which the blank 2 is molded. The air injection needle is preferably aligned with the groove 12, since the small extent of expansion of the parison permits the use of a short needle. The hole 21 left by the needle is shown in FIGS. 1 and 2.

The groove 12 including the side wall 14 forms a gripping surface for rigidly supporting the blank 2 in a holder during the trimming operation. Preferably, the holder is in the form of a pair of semi-circular collars that have substantially the same configuration as the side wall 14. While the neck portion 10 of the blank is clamped in the holder, a knife having a circular cutting edge lying in a plane substantially parallel to the radial wall 18 is applied over one of the closed ends 4 of the blank and is displaced toward the neck portion 10. The knife edge is arranged substantially coaxially with the central axis of the blank 2 and has a diameter greater than that of the wall 6, but less than that of the interior surface of the cylindrical portion 19. The cylindrical portion 19 of the flange 16 resists longitudinal displacement as the cutting knife pierces the radial wall 18. A typical cutting line 17 is shown in FIG. 3.

Similarly, the radial wall 18 on the opposite side of the groove 12 is severed by a cylindrical knife. Thus, the neck portion 10 is separated from the cylindrical portions 6 to form the containers or cans 20. Each of the cans 20 has a radial lip 22 surrounding the mouth of the can. The lip 22 formerly was part of the radial wall 18. This flange may be used for securing a cover, cap, or other type of closure over the mouth of the can, after the can is filled.

FIGS. 4 and 5 disclose schematically apparatus for temporarily holding the blank 2 stationary during the cutting operation and subsequently separating the cans 20 from the neck portion 10. In FIG. 4, a pair of arcuate segments 24 and 26 cooperate to clamp the neck portion 10 during the trimming operation. The arcuate segments 24 and 26 form a circular opening with opposite chamfered faces corresponding to the size and shape of the groove 12, including the side walls 14. The arcuate segments 24 and 26 may be mounted on sliding plates or other means for selectively moving the segments together and apart from each other to permit inserting and removing the neck portion 10 of the blank.

A knife 28 including an elongated tube 30 and a knife blade 32 rigidly secured to one end of the tube 30 is applied over the end of the blank 2, while the blank is rigidly clamped between the segments 24 and 26. The knife 28 is arranged substantially coaxially with the central axis of the blank and the cutting edge of the blade 32 is arranged to sever the radial wall 18 round the entire circumference simultaneously by longitudinal movement toward the segments 24 and 26. Preferably, another knife assembly 28 is applied over the opposite end of the blank 2 and displaced toward the segments 24 to sever the other radial wall 18 simultaneously with the severing of the first radial wall.

When the can 20 is severed from the neck portion 10, the knife 28 may be retracted to its original position. Friction between the tube 30 and the severed can 20 causes the can to be retained in the tube 30. When the knife 28 is again applied over the end of another blank 2, the end wall 4 of the blank pushes the previously severed can 20 out through the open end of the tube 30. The severed neck portion 10 may be released by separating the arcuate segment 24 from the segment 26. Then, the neck portion may be removed by any suitable means.

As shown in detail in FIG. 6, the arcuate segment 24 substantially conforms to the shape of the groove side wall 14 and rigidly supports the side wall. The cylindrical portion 19 of the flange 16 resists displacement longitudinally toward the segment 24 during the severing of the radial wall 18 by the knife 32. The knife penetrates the wall 18 without greatly deflecting the radial wall 18, since the wall is supported against bending by the cylindrical portion 19. Furthermore, there is sufficient space provided between the wall 18 and the side wall 14 to allow for slight deflection of the wall 18 prior to cutting by the blade 32.

Although the wall 18 is shown in FIG. 6 as extending substantially radial and perpendicular with respect to the cylindrical wall 6, the wall may be inclined with respect to the wall 6. For example, the wall 18 of the flange 16 may be inclined outwardly away from the cylindrical wall 6 at an angle from a radial plane. When the can is severed from the neck portion 10, the lip 22 of the can slopes upwardly and has a frustoconical shape with a projected apex being inside the can. When a flat lid is applied against the mouth of the can, the lip cushions the impact on the wall of the can and the outer edge of the lip deflects in the direction of movement of the lid to form a larger sealing surface. A large sealing surface is desirable, because it minimizes the possibilities of defective seals being produced during sealing or crimping operations.

By providing a radial wall 18 in the neck portion 10 of the blank, and then servering the wall to separate the can 20, a wide mouth container is readily formed from a tandem blow molded blank. The lip on the can 20 is substantially uniformly spaced from the central axis of the container and the lip lies substantially in a plane perpendicular to the central axis of the container. Thus, a suitable cap or other cover may be applied conveniently without being distorted. The use of a cylindrical knife blade for servering the radial wall also has the advantage of permitting the severed containers to be conveyed through the center of the knife assembly to a separate point of discharge from the connecting portion 10 which is scrap. Also, the cans produced by this process have uniformly shaped lips and therefore identical covers may be applied more readily. When used with needle blown blanks of plastic material, the process of this invention permits very high production rates and relatively low cost thin wall, wide mouth plastic containers may be produced inexpensively.

While this invention has been illustrated and described in one embodiment, it is recognized that variations and changes may be made without departing from the invention as set forth in the claims.

What is claimed is:

1. A process for making wide mouth plastic containers comprising molding a hollow blank having closed opposite ends and having a neck portion with a pair of flanges extending radially of the central axis of said blank, said flanges being spaced apart longitudinally of said axis, applying a holder to said blank between said flanges, passing a knife coaxially over said blank from one end, displacing said knife longitudinally of said axis until one of said flanges is penetrated by the knife, passing a knife over the blank from the other end, and displacing said knife longitudinally of said axis to penetrate the other flange, whereby the neck portion of said blank between said flanges is separated from the containers are the end portions of the blank.

2. The process according to claim 1 wherein said blank molding includes blowing a tubular parison in a mold to form said blank, including inserting an air injection needle in said parison at said neck portion.

3. The process according to claim 1 wherein said blank end portions each have a cylindrical wall, and said flanges extending outwardly from said end portion walls.

4. The process according to claim 1 wherein said neck portion has a circumferential groove with opposed side walls, said groove being between said flanges, and stopping said knife displacing after penetrating said one flange, whereby said groove side walls are not penetrated by the knife.

5. The process according to claim 4 wherein said holder is applied to said blank only between said groove side walls, thereby providing cantilever support for said blank end portions.

6. The process according to claim 1 including withdrawing said knife from said neck portion after penetrating said wall section.

7. The process according to claim 6 including gripping said end portion in said knife while withdrawing said knife from said neck portion.

8. The process according to claim 7 including removing said severed neck portion from said holder, applying said holder to a second hollow blank of substantially the same size and shape as said first-mentioned blank, and passing said knife coaxially over said second blank, whereby said second blank end portion engages and displaces said end portion severed from said first-mentioned blank toward a discharge point by motion of said knife relative to said second blank.

9. The process according to claim 1 wherein a pair of knives are displaced simultaneously toward said flanges from the opposite ends of said blank, whereby the end portions are severed simultaneously.

References Cited
UNITED STATES PATENTS

| | | | |
|---|---|---|---|
| 2,138,279 | 6/1964 | Meissner | 264—98 |
| 3,224,038 | 12/1965 | Budesheim | 264—98 |

ROBERT F. WHITE, *Primary Examiner.*

R. SHEAR, *Assistant Examiner.*

U.S. Cl. X.R.

83—54; 264—159